United States Patent [19]

Caspersen et al.

[11] Patent Number: 4,560,543

[45] Date of Patent: Dec. 24, 1985

[54] PROCESS FOR DESULFURIZATION OF HOT WASTE GAS

[75] Inventors: Leif D. Caspersen, Hørsholm; Karsten S. Felsvang, Allerød; Christian Schwartzbach, MÅløv, all of Denmark

[73] Assignee: A/S Niro Atomizer, Soborg, Denmark

[21] Appl. No.: 615,434

[22] Filed: May 30, 1984

[30] Foreign Application Priority Data

Jun. 3, 1983 [DK] Denmark ............................ 2553/83

[51] Int. Cl.[4] .......................... C01B 17/00; B01J 8/00
[52] U.S. Cl. ..................................... 423/242; 423/244
[58] Field of Search .......... 423/242 A, 242 R, 244 A, 423/244 R; 159/4 A, 4 R

[56] References Cited

U.S. PATENT DOCUMENTS

| | | | |
|---|---|---|---|
| 3,687,613 | 8/1972 | Rickard | 423/242 |
| 4,081,513 | 3/1978 | Moss | 423/244 |
| 4,197,278 | 4/1980 | Gehri et al. | 423/242 |
| 4,198,380 | 4/1980 | Kohl | 423/242 |
| 4,246,242 | 1/1981 | Butler et al. | 423/210 |
| 4,279,873 | 7/1981 | Felsvang et al. | 423/242 |
| 4,309,393 | 1/1982 | Nguyen | 423/242 |
| 4,329,324 | 5/1982 | Jones | 423/244 |
| 4,472,364 | 9/1984 | Bauerle et al. | 423/242 |
| 4,519,990 | 5/1985 | Bevilaqua et al | 423/210 |

FOREIGN PATENT DOCUMENTS

| | | |
|---|---|---|
| 0022367 | 1/1981 | European Pat. Off. . |
| 2332051 | 6/1977 | France . |
| 2418018 | 9/1978 | France . |
| 48-8458 | 1/1974 | Japan ................. 423/242 |
| 48-8459 | 1/1974 | Japan ................. 423/242 |

*Primary Examiner*—Gregory A. Heller
*Attorney, Agent, or Firm*—Beveridge, DeGrandi, Weilacher

[57] ABSTRACT

Hot waste gas is desulfurized in a spray drying-absorption process performed in an absorption chamber wherein a fluidized layer of partially reacted absorbent is maintained in the bottom area. Improved conditions are obtained for the reaction between absorbent and sulfur oxides in the waste gas, whereby the use of inexpensive absorbents of relatively low reactivity, such as limestone, comes into consideration.

19 Claims, 4 Drawing Figures

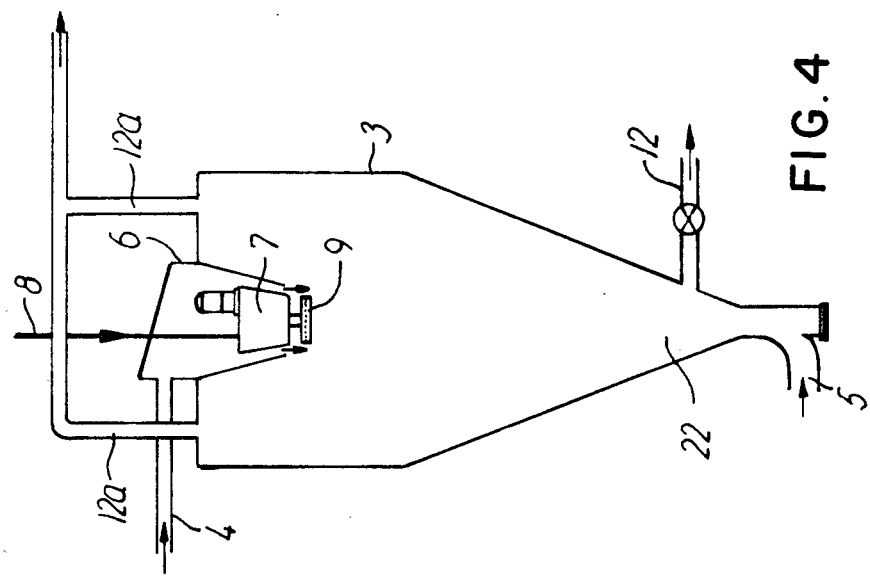
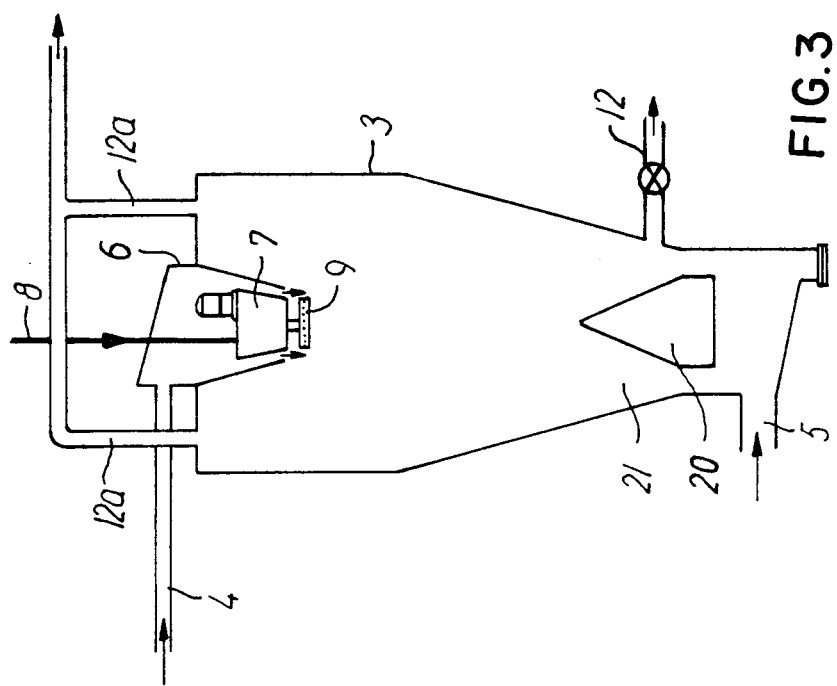

PROCESS FOR DESULFURIZATION OF HOT WASTE GAS

FIELD OF THE INVENTION

The present invention relates to desulfurization of hot waste gas such as flue gas resulting from the combustion of sulfur containing fuels. More specifically the invention relates to such a desulfurization which is termed spray drying-absorption, viz. a process in which a liquid containing an absorbent is atomized into the hot waste gas to be desulfurized, whereby a simultaneous drying of the atomized droplets and absorption of sulfur oxides in the waste gas take place. Such processes have several advantages over other desulfurization methods, i.a. because they only produce a dry, powdery waste product which is relatively easy to handle and dispose of or utilize.

BACKGROUND PRIOR ART

Hitherto flue gas desulfurization processes based on the spray drying-absorption-principle have primarily been performed using slaked lime as absorbent, and by using recycling of the absorbent and careful control of various parameters in the process it is possible to obtain a rather efficient utilization of said absorbent in the process.

However, in large plants such as power stations the absorbent costs are considerable and, especially in case of high sulfur coal, may represent a bar to the utilization of the otherwise very attractive spray drying-absorption desulfurization.

Therefore it is an object of the present invention to minimize absorbent costs in the spray drying-absorption desulfurization.

Said object and other advantages are obtained by the process according to the invention which makes possible an efficient utilization of an absorbent which is considerably cheaper than slaked lime, viz. limestone. Alternatively the process may be performed using e.g. slaked lime obtaining a substantially more efficient utilization thereof than in the prior art spray drying-absorption processes.

Use of limestone ($CaCO_3$, $MgCO_3$ and other naturally occuring impurities) as absorbent in flue gas desulfurization processes is well known in connection with wet scrubbing.

However, in the spray drying-absorption processes limestone has hitherto been regarded as unsuitable because only a very small proportion of the limestone introduced in these prior art processes reacts with the sulfur oxides in the waste gas and therefore no economical benefits were obtained by using limestone, even if said material is 5-10 times cheaper than slaked lime.

Known is also a gas desulfurization process in which a partial desulfurization takes place by passing the gas through of fluidized bed of particles of solid absorbent which is preferably CaO or precursors therefore (cf. Moss U.S. Pat. No. 4.081.513). The thus partly desulfurized gas is afterwards cleaned by means of a wet scrubbing process and the sludge resulting therefrom dried in said fluidized bed. However, the operation of such a combined system is complicated and is less suitable than the spray drying-absorption process for treating large amounts of waste gas.

DESCRIPTION OF THE INVENTION

We have now found that very favourable reaction conditions enabling an efficient utilization of limestone as absorbent in a spray drying-absorption desulfurization process, for desulfurization of a hot stream of waste gas, may be obtained in a process according to the invention, which is characterized in (i) injecting a stream of the waste gas downwards in the upper part of an absorption chamber, (ii) atomizing an aqueous liquid containing an absorbent for sulfur oxides into said downward gas stream in the absorption chamber, thereby drying the atomized liquid and forming a particulate material of absorbent partly reacted with sulfur oxides, (iii) adjusting the amount and water content of said liquid dependent on the drying capacity of the downward gas stream to such values that the drying of the atomized liquid in said downward gas stream produces a particulate material having a moisture content of at least 3% by weight, preferably at least 5% by weight, more preferably at least 10% by weight, (iv) introducing an upward stream of gas in the bottom part of the absorption chamber at a rate sufficient for fluidizing and drying the particulate moist material produced in step (ii), (v) withdrawing particulate spent absorbent and a stream of gas of reduced sulfur oxide content from the absorption chamber. A preferred embodiment of the process comprises the following steps:

(a) Dividing the stream of waste gas in a first and a second gas stream, (b) injecting said first gas stream downwards in the upper part of an absorption chamber, (c) atomizing an aqueous liquid comprising an absorbent for sulfur oxides into said first gas stream in the absorption chamber, thereby drying the atomized liquid and forming a particulate material of absorbent reacted with sulfur oxides, (d) adjusting the amount and water content of said liquid dependent on the drying capacity of the first gas stream to such values that the drying of the atomized liquid in said first gas stream produces a particulate material having a moisture content of at least 3%, preferably at least 5%, more preferably at least 10%.

(e) introducing said second gas stream upwards in the bottom part of the absorption chamber at a rate sufficient for fluidizing the particulate moist material produced in step (c),. and (f) withdrawing particulate spent absorbent and a stream of waste gas of reduced sulfur oxide content from the absorption chamber.

In comparison with conventional spray drying-absorption processes the process according to the invention provides a prolonged contact between the waste gas and the particles of absorbent while they have a high moisture content, and it has turned out that said high moisture content is essential for the reaction between sulfur dioxide and the absorbent, especially when the absorbent is limestone. However, also when other absorbents are used the process provides important advantages since it enables extremely high degrees of conversion to be obtained with for instance slaked lime and sodium carbonate. Thereby an efficient utilization of such other absorbents may be obtained with no or with only moderate recycling of the absorbent.

When limestone is used a small particle size is essential for obtaining a high degree of conversion and it is preferred to comminute the limestone to obtain a particle size which for at least 90 weight-% of the material is below 10 microns.

In the preferred embodiment the gas stream which is injected downwards in the upper part of the absorption chamber amounts to 75–95% of the total waste gas stream to be desulfurized. Said percentages reflect the fact that the predominating part of the absorption takes place in the area above the fluidized layer, and the main function of the fluidized layer is to make it possible to maintain such conditions, especially as to humidity, in the upper part of the drying chamber that an improved absorption is achieved.

The invention also encompasses a reactor suitable for carrying out the process and comprising an absorption chamber having a conical downward tapering lower portion, a rotary atomizer arranged centrally in the roof of said chamber, a roof air disperser surrounding the atomizer for ejecting a downward stream of waste gas to be desulfurized around the atomizer, a fluidized bed assembly in the bottom part of the chamber, means for withdrawing desulfurized gas from the chamber, and means for withdrawing spent absorbent from the chamber.

It is an essential feature of the process and of the reactor that the primary drying to which the atomized droplets is subjected by the downward gas stream in the drying chamber is controlled to form moist and reactive particles. This is only possible because a high concentration of particles exists in the bottom part of the drying chamber which particles are fluidized in an upward gas stream. Only after having reached said fluidized layer the particles are dried sufficiently to form a nonsticky material.

It will be understood that a substantially more efficient reaction between the gas and the moist particles is possible by using the principle of the invention than by using the conventional spray drying-absorption, in which a fast drying of the atomized droplets to dry powder is essential to avoid operational difficulties.

Moreover the process and reactor according to the present invention ensures favourable contact between particles and gas due to the turbulent conditions prevailing especially at the interface between the fluidized bottom layer and the upper spray drying zone in the drying chamber.

DESCRIPTION OF THE DRAWINGS

The invention is further explained in the following by reference to the drawing, wherein FIG. 1 very schematic depicts a plant for carrying out one embodiment of the process according to the invention, FIG. 2 very schematic depicts a plant for carrying out another embodiment of the process of the invention, FIG. 3 illustrates a reactor according to the invention to be used as an alternative to the one shown in FIGS. 1 or 2, and FIG. 4 illustrates a further reactor according to the invention alternative to the one shown in FIGS. 1, 2 or 3.

DESCRIPTION OF THE PREFERRED EMBODIMENTS.

Figure 1:
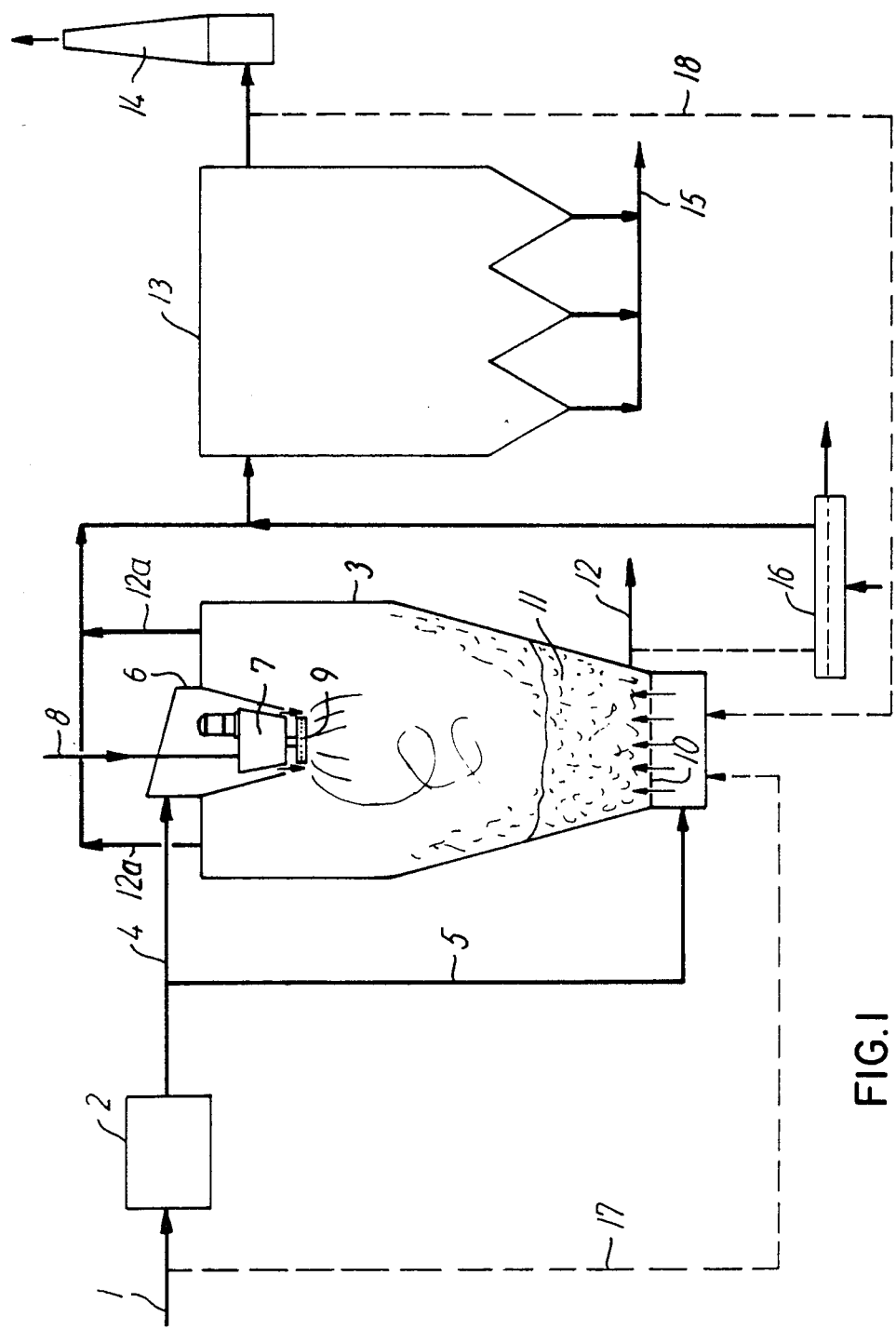

Referring to FIG. 1 a duct 1 delivers hot waste gas to a heat exchanger 2 wherein heat energy of the waste gas is utilized, e.g. for preheating air or water for the boiler plant delivering the waste gas.

After having passed the heat exchanger the waste gas is divided into two streams which are let to an absorption chamber 3 through ducts 4 and 5 respectively The drying chamber or reactor 3 which has a conical downward tapering lower portion, is provided with a roof air disperser 6 surrounding a rotary atomizer 7 to which an aqueous absorbent suspension, preferably a suspension of finely comminuted limestone, is supplied via conduit 8.

The waste gas from duct 4 is by the roof air disperser 6 injected in a downward direction around the atomizer wheel 9.

By contact between the atomized aqueous absorbent suspension and the downward directed stream of waste gas a substantial part of the sulfur oxides, especially $SO_2$, in the waste gas is absorbed and a part of the water content of the atomized droplets of absorbent suspension evaporates.

It is an important feature of the invention that said evaporation is not too rapid or excessive, and it is preferred that e.g. around 20% of water is still present in the resulting particles when these reach a fluidized particle layer maintained in the bottom portion of the absorption chamber 3 as explained below.

In the embodiment illustrated in FIG. 1. a perforated supporting plate 10 is arranged in the lower part of the absorption chamber 3. The waste gas introduced through duct 5, typically amounting to 5–25% of the total amount of waste gas in duct 1, enters the absorption chamber in an upward direction and is able to maintain a layer 11 of particles in a fluidized condition in the bottom of the chamber.

The fluidized layer 11 permanently receives moist particles from the upper portion of the drying chamber. In the fluidized layer the particles are dried and a partial absorption of sulfur oxides present in the waste gas introduced through duct 5 takes place.

Spent absorbent particles are withdrawn from the fluidized layer through conduit 12.

The desulfurized waste gas together with entrained particles is withdrawn from the absorption chamber through conduits 12a and is via a particle separator 13 let to a stack 14 for release to the atmosphere.

The particle separator is preferably a bag house in which a further absorption of sulfur oxides may take place due to the relative prolonged contact between gas and absorbent. Particles separated in the particle separator are recovered through 15.

The drying performed in the fluidized layer 11 may be extended to achieve such low moisture content in the particulate spent absorbent that it is easy to handle upon recovering through conduit 12. However, it might be preferred to recover the spent absorbent from the fluidized layer 11 with a higher moisture content than desired and to perform a further drying operation in an external fluidized bed apparatus 16, preferably a vibrated fluidized bed apparatus. In that case it is preferred to provide (not shown) drying gas from a stream of non-desulfurized or only partly desulfurized waste gas in the system. Thereby a further removal of sulfur oxides may be obtained. The exit gas from the external fluidized bed apparatus is let to the particle separator 13 before being released to the atmosphere.

In the embodiment described above the fluidizing air introduced in the bottom of the absorption chamber has substantially the same temperature as the gas introduced in the upper part of said chamber. However, if an accelerated drying is desired in the fluidized layer a more hot gas may be used, e.g. waste gas withdrawn from a site upstream of the heat exchanger 2 as indicated by the dotted line 17 on FIG. 1. On the other hand if it is desired to retard the drying process the gas introduced for fluidizing the particles may partly or totally consist of relatively cool gas withdrawn downstream of the particle separator 13, as indicated on FIG. 1 by the dotted line 18 or resulting from another source. The particles of spent absorbent withdrawn through conduit 12 or through 15 or from the external fluidized bed apparatus 16 comprise the sulfur removed from the waste gas, which sulfur is present as sulfite and sulfate, and further contain nonreacted absorbent. In case the waste gas in duct 1 contains fly ash this will be present in the spent ab- sorbent.

Although highly improved conditions for the absorption may be obtained in the drying chamber by the process according to the invention, the spent absorbent may still contain such proportions of non-reacted absorbent that it is suitable for reuse in the production of aqueous absorbent suspension to be atomized. When limestone is used as absorbent it is preferred to grind the spent absorbent before recycling thereof to the feed suspension preparation step. By such a grinding process surfaces of non-reacted absorbent will be exposed and available for the following absorption process.

The temperature of the waste gas introduced via duct 4 may vary within wide limits, e.g. between 80° and 750° C. and the temperature of the gas leaving the absorption chamber will preferably be 2°–40° C., more preferably 2°–8° C., above the adiabatic saturation temperature of said leaving gas. Thereby an efficient absorption may be obtained and at the same time sticking of the spent absorbent in the particle separator and in the connecting ducts may be avoided.

Figure 2:
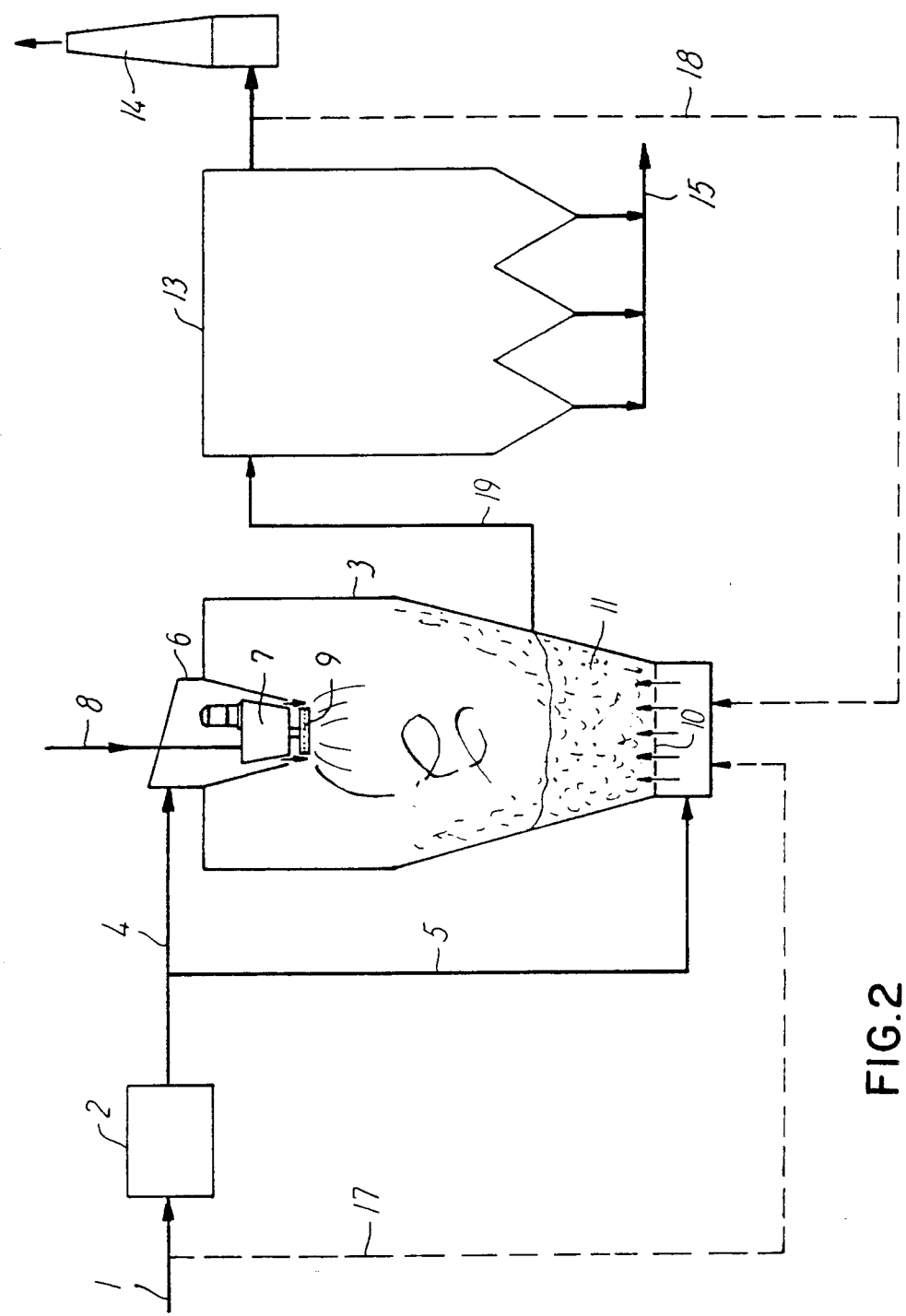

On FIGS. 2, 3 and 4 the same numbers are used for the same elements as in FIG. 1.

In the embodiment shown in FIG. 2 the desulfurized waste gas is withdrawn from the drying chamber 3 together with particulate spent absorbent from the fluidized layer 11 through a duct 19. That means that the total amount of spent absorbent is, entrained in the treated waste gas, conveyed to the particle separator 13 from which it is withdrawn through 15. By this embodiment the total amount of absorbent participates in the supplementary absorption process taking place in the particle separator 13.

When the gas used for creating the fluidized layer 11 in the absorption chamber 3 has a substantial content of particulate material such as fly ash, there is a potential risk that said particulate material may block the perforations of the plate 10 shown in FIGS. 1 and 2.

Consequently it may be an advantage to substitute a so-called spouted bed arrangement for the perforated supporting plate. Examples of reactors with such spouted beds are shown in FIGS. 3 and 4.

The reactor illustrated in FIG. 3 comprises a conical body 20 centrally in the bottom portion of the chamber 3. In that embodiment the fluidized layer is maintained in and/or above the annular space 21 or a plurality of holes between the conical body 20 and the walls of the chamber 3.

The reactor of FIG. 4 represents a more simple construction wherein the fluidized layer is maintained in the bottom part 22 of the funnel-shaped absorption chamber.

Devices as those shown in the bottom of the reactors of FIGS. 3 and 4, respectively and other arrangements for supporting spouted fluidized beds are known per se. For a detailed description see Mathur, Kishan B. and Norman Epstein: "Spouted Beds", Academic Press, New York, San Francisco, London (1974).

The invention is further illustrated by means of the following embodiment example:

EXAMPLE

The process is carried out in a plant as the one depicted on the drawing, FIG. 1.

Flue gas from a power station and having a $SO_2$ content of 1000 ppm and a temperature of 155° C. (after having passed the heat exchanger) is divided in a first stream (630,000 kg/h) and a second stream (120,000 kg/h).

The first stream is led to the roof gas disperser 10 of the reactor, as shown on the drawing.

An aqueous suspension of limestone (particle size $90\% < 10 \mu$) and recycled spent absorbent and having a total solids content of 35% by weight, is in an amount of 47,400 kg/h atomized in said first stream in the reactor.

Thereby particles of absorbent and reaction products are formed having a moisture content of 20% and the gas is cooled to 65° C. which is 3° C. above wet bulb temperature.

The particles reach the lower part of the absorption chamber where they become fluidized by said second gas stream which is introduced at the bottom end at a temperature of 155° C. Thereby a drying and further $SO_2$-absorption takes place, and the particles are recovered having a moisture content of 5%.

The desulfurized gas leaves the top portion of the chamber at a temperature of 68° C. and with a $SO_2$-content reduced to 100 ppm.

We claim:

1. A process for desulfurization of a hot waste gas containing sulfur oxides, comprising the steps of
   (i) injecting a stream of the waste gas downwards in the upper part of an absorption chamber,
   (ii) atomizing an aqueous liquid containing an absorbent for sulfur oxides, said absorbent being selected from the group consisting of limestone, slaked lime and sodium carbonate, into said downward gas stream in the absorption chamber, thereby drying the atomized liquid and forming a particulate material of absorbent partly reacted with sulfur oxides,
   (iii) adjusting the amount and water content of said liquid dependent on the drying capacity of the downward gas stream to such values that the drying of the atomized liquid in said downward gas stream produces a particulate material having a moisture content of at least 3% by weight,
   (iv) introducing an upward stream of gas in the bottom part of the absorption chamber at a rate sufficient for fluidizing and drying the particulate moist material produced in step (ii) thereby producing a fluidized layer of said particulate material in the bottom part of the absorption chamber,
   (v) withdrawing particulate spent absorbent and a stream of gas of reduced sulfur oxide content from the absorption chamber.

2. A process for desulfurization of a hot stream of waste gas containing sulfur oxides, comprising the steps of
   (a) dividing the stream of waste gas in a first and a second gas stream, (b) injecting said first gas stream downwards in the upper part of an absorption chamber, (c) atomizing an aqueous liquid comprising an absorbent for sulfur oxides, said absorbent being selected from the group consisting of limestone, slaked lime and sodium carbonate, into said first gas chamber, thereby drying the atomized liquid and forming a particulate material of absorbent partly reacted with sulfur oxides, (d) adjusting the amount and water content of said liquid dependent on the drying capacity of the first gas stream to such values that the drying of the atomized liquid in said first gas stream produces a particulate material having a moisture content of at least 3%, (e) introducing said second gas stream upwards in the bottom part of the absorption chamber at a rate sufficient for fluidizing the particulate moist material produced in step (c), thereby producing a fluidized layer of said particulate material in the bottom part of the absorption chamber, and (f) withdrawing particulate spent absorbent and a stream of waste gas of reduced sulfur oxide content from the absorption chamber.

3. The process of claim 1, wherein the particulate material is dried to a moisture content of at least 5% by weight in the downward gas stream.

4. The process of claim 1, wherein the particulate material is dried to a moisture content of at least 10% by weight in the downward gas stream.

5. The process of claim 2, wherein the division of the stream of waste gas in a first and a second stream is performed upstream of a heat exchanger and the first stream is cooled in said heat exchanger before being injected into the absorption chamber.

6. The process of claim 1, wherein the upward stream introduced in the bottom part of the absorption chamber is a partial stream of the gas withdrawn from the absorption chamber from which particulate material has been removed.

7. The process of claim 1, wherein the absorbent is limestone ($CaCO_3$).

8. The process of claim 1, wherein the absorbent is limestone comminuted to a particle size which for at least 90 weight % of the material is below 10 microns.

9. The process of claim 2, wherein said first gas stream amounts to 75–95% of the total waste gas stream to be desulfurized.

10. The process of claim 1, wherein spent absorbent is withdrawn from the bottom part of the absorption chamber and the desulfurized gas entraining some spent absorbent is withdrawn from the upper part thereof.

11. The process of claim 1, wherein the total amount of spent absorbent leaves the absorption chamber entrained in the desulfurized gas stream.

12. The process of claim 1, wherein the gas leaving the absorption chamber is passed via a particle separator to a stack.

13. The process of claim 1, wherein the gas leaving the absorption chamber is passed via a bag house to a stack.

14. The process of claim 2, wherein the temperature of the gas forming said first stream is 80°–750° C. and the temperature of the gas leaving the absorption chamber is 2°–40° C. above the adiabatic saturation temperature of said leaving gas.

15. The process of claim 2, wherein the temperature of the gas leaving the absorption chamber is 2°–8° C. above the adiabatic saturation temperature of said leaving gas.

16. The process of claim 1, wherein the spent absorbent is withdrawn from the bottom part of the absorption chamber and is further dried and utilized for further desulfurization in a fluidized bed outside the absorption chamber.

17. The process of claim 1, wherein a portion of the spent absorbent recovered from the absorption chamber is recycled for preparation of the liquid to be atomized in step (ii).

18. The process of claim 1, wherein a portion of the spent absorbent is subjected to a grinding process to expose surfaces of non-reacted absorbent and is recycled for preparation of the liquid to be atomized in step (ii).

19. The process of claim 1, wherein the atomization in step (ii) is performed by means of a rotary atomizer.

* * * * *